US007062071B2

(12) United States Patent
Tsujino et al.

(10) Patent No.: US 7,062,071 B2
(45) Date of Patent: Jun. 13, 2006

(54) APPARATUS, PROGRAM AND METHOD FOR DETECTING BOTH STATIONARY OBJECTS AND MOVING OBJECTS IN AN IMAGE USING OPTICAL FLOW

(75) Inventors: Hiroshi Tsujino, Saitama (JP); Hiroshi Kondo, Saitama (JP); Atsushi Miura, Saitama (JP); Shinichi Nagai, Saitama (JP); Koji Akatsuka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 755 days.

(21) Appl. No.: 10/322,307

(22) Filed: Dec. 17, 2002

(65) Prior Publication Data

US 2003/0152271 A1 Aug. 14, 2003

(30) Foreign Application Priority Data

Dec. 28, 2001 (JP) ............................. 2001-399472

(51) Int. Cl.
*G06K 9/00* (2006.01)

(52) U.S. Cl. ...................... 382/103; 382/104; 382/153
(58) Field of Classification Search ................ 382/103, 382/104, 153
See application file for complete search history.

(56) References Cited

U.S. PATENT DOCUMENTS

| 5,991,428 | A | * | 11/1999 | Taniguchi .................... 382/107 |
| 6,049,619 | A | * | 4/2000 | Anandan et al. ............. 382/107 |
| 6,335,977 | B1 | * | 1/2002 | Kage .......................... 382/107 |
| 2005/0248654 | A1 | * | 11/2005 | Tsujino et al. .............. 348/169 |

FOREIGN PATENT DOCUMENTS

| JP | 07-249127 | 9/1995 |
| JP | 2000-242797 | 9/2000 |

OTHER PUBLICATIONS

Giachetti et al.; "Dynamic segmentation of Traffic Scenes", Proceedings of the Intelligent Vehicles '95 Symposium, Sep. 1995.*

Tsao et al.; "A Neural Computational Scheme for Extracting Optical Flow from the Gabor Phase Differecnes of Successive Images", IEEE, 1992.*

Hatsopoulos et al.; "Collision-avoidance system based on optical flow", Proceedings of the Intelligent Vehicles '92 Symposium, pp. 79-84, Jul. 1992.*

(Continued)

*Primary Examiner*—Joseph Mancuso
*Assistant Examiner*—Jordan Kuhn
(74) *Attorney, Agent, or Firm*—Fenwick & West LLP

(57) ABSTRACT

An object detection apparatus is provided for detecting both stationary objects and moving objects accurately from an image captured from a moving mobile unit.

The object detection apparatus of the present invention applies Gabor filter to two or more input images captured by an imaging device such as CCD camera mounted on a mobile unit, and calculates optical flow of local areas in the input images. Then the object detection apparatus closely removes optical flow produced by motion of the mobile unit by estimating optical flow produced from background of the input images. In other words, the object detection apparatus clarifies the area where object is not present ("ground") in the input images. By removing such "ground" part, the area where objects seems to be present ("feature") is extracted from the input images. Finally, the object detection apparatus determines whether objects are present or not using flow information of the extracted "feature" part.

14 Claims, 14 Drawing Sheets

OTHER PUBLICATIONS

Attolico et al.; "Shape Recovery of Collsion Zones for Obstacle Avoidance", IEEE/RSJ International Workshop on Intelligent Robots and Systems IROS '91, Nov. 3-5, 1991.*

Giachetti et al.; "The Use of Optical Flow for Road Navigation", IEEE Transactions on Robotics and Automation, vol. 14 No. 1, Feb. 1998.*

* cited by examiner (a)                              (b)

dw MAP FOR UPWARD DIRECTION ( ↑ )

| 3 | 3 | 4 | 4 | 0.5 |
|---|---|---|---|-----|
| 0.5 |   | ... |   |   |
|   |   |   |   |   |
|   |   |   |   |   |
|   |   |   |   |   |

(a)

dw MAP FOR LEFTWARD DIRECTION ( ← )

| 1 |   |   |   |   |
|---|---|---|---|---|
| 1.5 | 1.5 | ... |   |   |
| 1 | 1 |   |   |   |
| 0.5 |   |   |   |   |
|   |   |   |   |   |

(b)

dw MAP

| 3 | 3 | 4 | 4 | 0.5 | ← A |
|---|---|---|---|-----|---|
| 1.5 | 1.5 |   |   |   |   |
| 1 | 1 | ... |   |   |   |
| 0.5 |   |   |   |   |   |
|   |   |   |   |   |   |

B (a)

DIRECTION MAP

| ↑ | ↑ | ↑ | ↑ | ↑ |
|---|---|---|---|---|
| ← | ← |   |   | → |
| ← | ← | ... |   | → |
| ← |   |   |   | → |
| ↓ | ↓ | ↓ | ↓ | ↓ |

| THE AVERAGE OF dw VALUES HAVING THE UPWARD FLOW DIRECTION IN GLOBAL AREA (a) |
| --- |
| THE AVERAGE OF dw VALUES HAVING THE DOWNWARD FLOW DIRECTION IN GLOBAL AREA (b) |
| THE AVERAGE OF dw VALUES HAVING THE UPWARD FLOW DIRECTION IN GLOBAL AREA (c) |
| THE AVERAGE OF dw VALUES HAVING THE DOWNWARD FLOW DIRECTION IN GLOBAL AREA (d) |
| THE AVERAGE OF dw VALUES HAVING THE RIGHTWARD FLOW DIRECTION IN GLOBAL AREA (e) |
| THE AVERAGE OF dw VALUES HAVING THE LEFTWARD FLOW DIRECTION IN GLOBAL AREA (f) |
| THE AVERAGE OF dw VALUES HAVING THE LEFTWARD FLOW DIRECTION IN GLOBAL AREA (g) |
| THE AVERAGE OF dw VALUES HAVING THE RIGHTWARD FLOW DIRECTION IN GLOBAL AREA (h) |

EIGHT FEATURES
(INPUT LAYER)

FIG. 10

| THE AVERAGE OF dw VALUES HAVING THE UPWARD FLOW DIRECTION IN GLOBAL AREA (a) |
|---|
| THE AVERAGE OF dw VALUES HAVING THE DOWNWARD FLOW DIRECTION IN GLOBAL AREA (b) |
| THE AVERAGE OF dw VALUES HAVING THE UPWARD FLOW DIRECTION IN GLOBAL AREA (c) |
| THE AVERAGE OF dw VALUES HAVING THE DOWNWARD FLOW DIRECTION IN GLOBAL AREA (d) |
| THE AVERAGE OF dw VALUES HAVING THE RIGHTWARD FLOW DIRECTION IN GLOBAL AREA (e) |
| THE AVERAGE OF dw VALUES HAVING THE LEFTWARD FLOW DIRECTION IN GLOBAL AREA (f) |
| THE AVERAGE OF dw VALUES HAVING THE LEFTWARD FLOW DIRECTION IN GLOBAL AREA (g) |
| THE AVERAGE OF dw VALUES HAVING THE RIGHTWARD FLOW DIRECTION IN GLOBAL AREA (h) |
| SELF-MOTION PARAMETER |
| SELF-MOTION PARAMETER |
| SELF-MOTION PARAMETER |

FIG. 12
FEEDBACK LOCAL FLOW
| 0.3 | 0.4 | 0.5 | 0.3 | 0.2 |
|---|---|---|---|---|
| 0.7 | 1.1 | 1.3 | 0.8 | 0.0 |
| 0.5 | 1.9 | 1.2 | 1.3 | 0.0 |
| 0.3 | 1.3 | 1.1 | 0.8 | 0.2 |
| 0.3 | 0.4 | 0.5 | 0.3 | 0.2 |
(a)
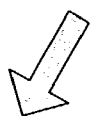 LESS THAN "1.0"    "1.0" OR MORE
GROUND PART
| 0.3 | 0.4 | 0.5 | 0.3 | 0.2 |
|---|---|---|---|---|
| 0.7 |  |  | 0.8 | 0.0 |
| 0.5 |  |  |  | 0.0 |
| 0.3 |  |  | 0.8 | 0.2 |
| 0.3 | 0.4 | 0.5 | 0.3 | 0.2 |
(b)
FIGURE PART
|  |  |  |  |  |
|---|---|---|---|---|
|  | 1.1 | 1.3 |  |  |
|  | 1.9 | 1.2 | 1.3 |  |
|  | 1.3 | 1.1 |  |  |
|  |  |  |  |  |
(c)
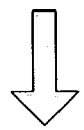
NEW LOCAL FLOW
| 0.3 | 0.4 | 0.5 | 0.3 | 0.2 |
|---|---|---|---|---|
| 0.7 | 0.0 | 0.0 | 0.8 | 0.0 |
| 0.5 | 0.0 | 0.0 | 0.0 | 0.0 |
| 0.3 | 0.0 | 0.0 | 0.8 | 0.2 |
| 0.3 | 0.4 | 0.5 | 0.3 | 0.2 |
(d)

FIG. 14

| PIXEL SEQUENCE IN OBJECT PRESENCE POSSIBILITY AREA |
| --- |
| LOCAL FLOW SEQUENCE IN OBJECT PRESENCE POSSIBILITY AREA |
| POSITION INFORMATION FOR OBJECT PRESENCE POSSIBILITY AREA |
| NUMERICAL REPRESENTATION ABOUT PRESENCE/ABSENCE OF OBJECTS |

(a)

| ↑ | ↑ | ← | ↓ | ↓ | ← | → | → | ↑ |
|---|---|---|---|---|---|---|---|---|
| 1.1 | 1.9 | 1.3 | 1.3 | 1.2 | 1.1 | 1.3 | 1.4 | 1.9 |

(b)

APPARATUS, PROGRAM AND METHOD FOR DETECTING BOTH STATIONARY OBJECTS AND MOVING OBJECTS IN AN IMAGE USING OPTICAL FLOW

TECHNICAL FIELD

The present invention relates to detecting objects in input images. In particular, the invention relates to an object detection apparatus, program and method for detecting both stationary objects and moving objects in input images captured from a mobile unit.

BACKGROUND OF THE INVENTION

There are some conventional approaches for detecting objects based on input images. According to one approach, optical flow is first calculated from captured images and a part corresponding to an object is then extracted from the area having the same motion component. Since moving objects in the image may be easily detected by this approach, some object detection apparatuses based on this approach are known in the art (for example, Japanese Patent Application Unexamined Publication (Kokai) No. 7-249127).

However, when an imaging device itself for capturing images moves (for example, an imaging device is mounted on an automobile), it is difficult to detect moving objects by above-described approach because optical flow is also generated by the motion of the imaging device. In this case, removing motion component generated by the motion of the imaging device from the calculated optical flow enables the object detection apparatus to detect moving objects in the captured image more accurately. For example, a method for detecting the movement is disclosed in Japanese Patent Application Unexamined Publication (Kokai) No. 2000-242797 wherein diffusion coefficients used in detecting optical flow in the image with gradient method is variable. According to the method, the diffusion coefficients may be varied with the addition of some conditions instead of the diffusion coefficients being constant like conventional approaches. By this method, noise tolerance may be improved and the differential of optical flow at the boundary of objects may be emphasized.

This method enables the object detection apparatus to calculate optical flow of the moving object more accurately. However, optical flow of stationary objects in background of the input images would not be compensated because they would be considered as a background by this method. Therefore, it is impossible by this method to detect stationary objects accurately.

It is actually possible to calculate the optical flow from each object even though the stationary objects in the stationary background are observed from a mobile unit. However, it is difficult to segment the optical flow of the objects from that of the background and such accurate segregating technique has not been realized.

Therefore, there exists a need for an object detection approach for accurately detecting both stationary objects and moving objects included in an image captured from a moving imaging device using optical flow.

SUMMARY OF THE INVENTION

An object detection apparatus of the invention applies Gabor filter to two or more input images captured by an imaging device such as a CCD camera mounted on a mobile unit, and calculate optical flow of local areas in the input images. Then the object detection apparatus closely removes optical flow produced by motion of the mobile unit by estimating optical flow produced from background of the input images. In other words, the object detection apparatus defines the area where objects are not present ("ground" part) in the input images. By removing such "ground" part, the area where objects seems to be present ("figure" part) is extracted from the input images. Finally, the object detection apparatus determines whether objects are present or not using flow information of the extracted "figure" part.

More specifically, an object detection apparatus for detecting objects in input images captured from a mobile unit of the invention comprises:

a local flow processor for calculating flow information for each local area (called "local flow" in preferred embodiments) in said input images;

a global flow processor for calculating flow information for each global area (called "global flow" in preferred embodiments) in said input images using said flow information for each local area;

a flow feature calculator for estimating motion of the mobile unit using said flow information for each global area, calculating new flow information using the estimated motion, comparing said new flow information with said flow information for each local area to extract local areas having flow information not consistent with said estimated motion; and an object presence/absence determiner for determining the presence or absence of objects in the extracted local areas.

Since the flow information generated by the motion of the mobile unit may be removed from the input images, the apparatus may detect objects in the input images highaccurately. The computing load may be small because the determination is done only for the extracted "figure" part of the input images. "New flow information" refers to "a feedback local flow", which is described in preferred embodiments.

The local flow processor calculates flow information for local areas. The term "local area" refers to each of the areas to which the input area is equally divided. It is preferable that local areas are overlaps one another. The size of each local area and overlapping width may be selected depending on the allowable processing time and required accuracy of the object detection.

Flow information for the local area contains size of predominant local flow in each local area (called "dw" value in preferred embodiments) and direction of that local flow (called "flow direction" in preferred embodiments). The dw value and flow direction are calculated by the following process. First, the local flow processor applies Gabor filter to each local area to calculate size of optical flow in predetermined directions of each local area as flow information of each local area. The predetermined directions are upward, downward, leftward and rightward in the image frame, preferably. The local flow processor compares size of optical flow in predetermined directions of the local area, sets the greatest one as size of flow (dw value) for the local area and sets the direction of that flow (flow direction) as the direction of the local area. The operation by the local flow processor described above proves which directional component of the optical flow is predominant in each local area. In other words, it proves which gives more influence on optical flow for each local area, the motion of the mobile unit or the presence of the object in the image.

The calculated flow information of local area (local flow) is used by a global flow processor. The global flow processor obtains all flow information for local areas included in each global area, selects local areas having the flow direction predetermined for each global area based on the flow information for local areas and sets average of sizes of flow for the selected local area (dw values) as the flow information for the global area (global flow). This global flow process is performed for estimating the motion of the mobile unit because characteristic flow information depending on the motion of the mobile unit is generated in the global area.

The number of the global areas is suitably selected. It is preferable that the global areas occupy the different peripheral area in the image frame each other such that each global area reflects the motion of the mobile unit best. Preferably, length of one edge of each global area is ⅖ (two fifth) of that of the image frame (in other words, each global area is sized to occupy ⅖ area of the image frame). It should be noted that other length of one edge of each global area may be used unless the global area occupies in the vicinity of the center of the input image frame where the motion of the mobile unit is difficult to be reflected.

The flow feature calculator applies the flow information for global area to result of first learning to estimate the motion of the mobile unit. This first learning is performed by associating said flow information for global area with the motion of the mobile unit using neural network. The motion of the mobile unit is captured by a sensor or given as training data. By this first learning, the motion of the mobile unit may be estimated based on the flow information for global area. In addition, by learning with images including few objects, stationary objects as well as moving objects in the image may be detected, which will be described later.

The neural network includes Perceptron, for example. If Perceptron is used, the motion of the mobile unit is estimated as the value of output cell of Perceptron.

The flow feature calculator extracts local areas having flow information not consistent with the estimated motion of the mobile unit. The object presence/absence determiner determines the presence or absence of objects in the extracted local areas based on second learning. This second learning is performed by associating said extracted local areas with presence or absence of objects. Whether the object is present or not is determined using eigenvectors, which is calculated by performing principal component analysis on data set that is obtained by the second learning. This approach is preferable in view of memory capacity. Alternatively, determination may be done according to other known approach such as pattern matching.

The motion of the mobile unit may be directly estimated from the flow information calculated by the local flow processor. It is also possible to extract local areas having different flow direction from the one produced by the estimated motion of the mobile unit. In this case, the object presence determination may be performed without the global flow processor.

Extracting local areas by the flow feature calculator is preferably repeated twice. In other words, the local areas extracted by flow feature calculator are preferably processed again by the global flow processor and the flow feature calculator as described above. It is possible to extract the local areas having different flow direction from the one generated by the estimated motion of the mobile unit. By performing the object presence determination process on this repeatedly extracted local areas, the accuracy of the extracting flow features and object presence possibility area may be improved.

According to another aspect of the invention, a computer program product executable on a computer for detecting objects in input images captured by an imaging device on a mobile unit, when executed, said computer program produce performing the steps of:

calculating flow information for each local area in said input images;

calculating flow information for each global area in said input images using said flow information for each local area;

estimating motion of the mobile unit using said flow information for each global area;

calculating new flow information using the estimated motion;

comparing said new flow information with said flow information for each local area to extract local areas having flow information not consistent with said estimated motion; and determining the presence or absence of objects in the extracted local areas.

The program may include further steps to implement other features described above. Another aspects of the invention will be apparent for the skilled in the art by reading the following description with reference to the attached drawings.

BRIEF DESCRIPTION OF THE DRAWINGS

FIG. 8 shows one example of a global flow map;

FIG. 10 shows one example of a data structure of training data;

FIG. 12 illustrates the concept of figure-ground segmentation;

FIG. 14 illustrates data structures of training data;

DETAILED DESCRIPTION OF THE PREFERRED EMBODIMENTS

Preferred embodiments of the invention are described in reference to the attached drawings.

Figure 1:
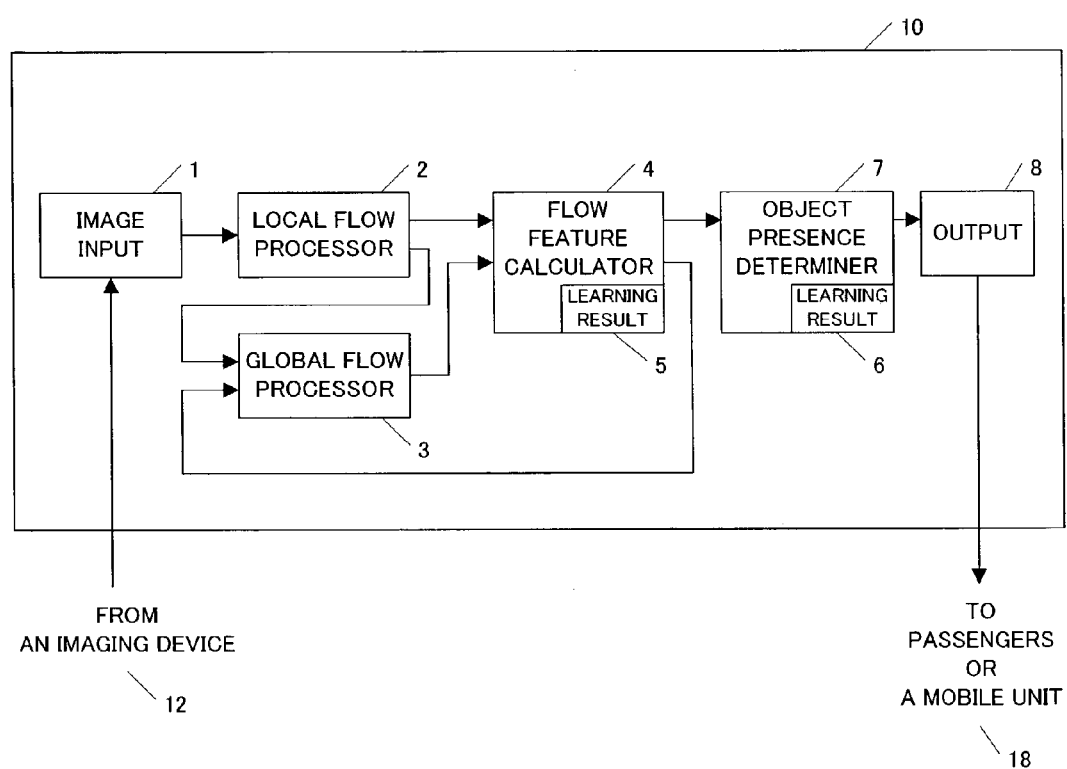
FIG. 1 shows a block diagram of an object detection apparatus of the invention.

FIG. 1 shows a block diagram of an object detection apparatus 10 of the invention. The object detection apparatus 10 receives input images (scenes) of traveling direction of a mobile unit, such as autonomous traveling automobile, captured by an imaging device 12 such as a CCD camera at predetermined intervals. The object detection apparatus 10 then determines whether there are some objects obstructing the travel of the mobile unit based on the input images, and outputs the result of the determination, which is sent to a motor or steering of the mobile unit. The mobile unit decelerates, stops, or avoids the object in response to the output. Alternatively, the presence of the object obstructing the travel of the mobile unit may be informed to passengers on the autonomous travel automobile.

The object detection apparatus 10 may be implemented by a microcomputer comprising a CPU for calculation, RAM for providing working area and temporary storing the computing result, ROM for storing the learning result and various data, and interface for inputting/outputting the data, for example. The object detection apparatus 10 is generally mounted on the mobile unit together with the imaging device 12. Alternatively, only the imaging device 12 may be mounted on the mobile unit. In this case, images captured by the imaging device 12 may be transmitted by any transmitter mounted on the mobile unit to some outside computers, where the object detection process may be actually performed. In consideration of such configuration, the object detection apparatus 10 is illustrated with some functional blocks. Some of these functional blocks may be implemented in software, firmware or hardware.

Images captured by the imaging device 12 at predetermined intervals are transmitted to a local flow processor 2 via the image input block 1. The local flow processor 2 applies the Gabor filter to at least two successive images to calculate flow information for local areas in the image (hereinafter referred to as "local flow"). The local flow is sent to a global flow processor 3 and a flow feature calculator 4.

The global flow processor 3 uses the local flows to calculate flow information for global areas (hereinafter referred to as "global flow"), each of which is larger than the local area.

The flow feature calculator 4 extracts from the image some local areas having the local flow not consistent with the optical flow of the mobile unit estimated based on the local flow, the global flow and learning result 5 that is prepared beforehand.

An object presence/absence determiner 7 determines whether objects are present in the local areas extracted by the flow feature calculator 4 based on learning result 6 that is prepared beforehand. The result of the determination is output via an output block 8.

Now each functional block is described in detail.

Local Flow Processor

Figure 2:
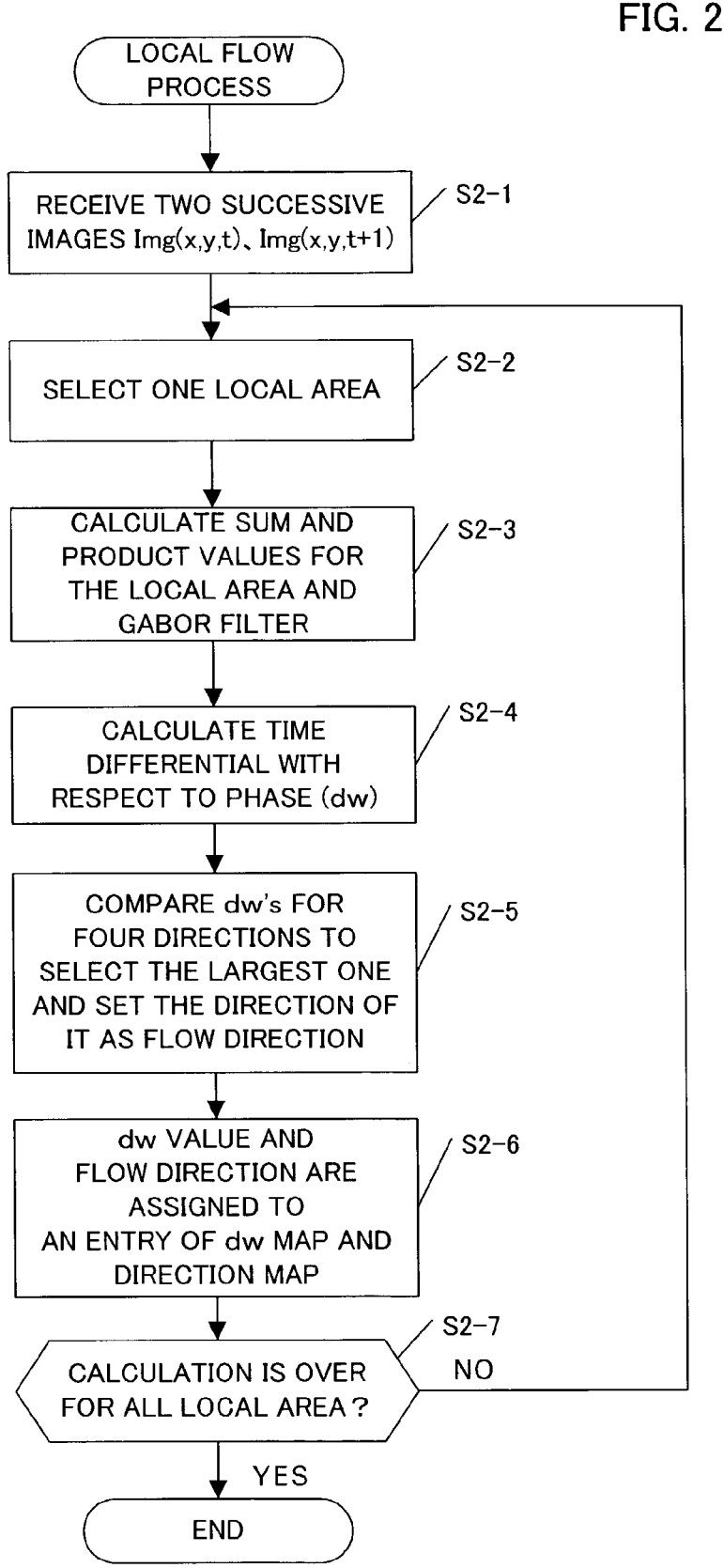
FIG. 2 is a flowchart of a local flow processor.

FIG. 2 is a flowchart illustrating operations in the local flow processor 2 during the object detection process.

First, the local flow processor 2 receives two successive images from the image input block 1 (S2-1). Pixels in the two successive images at time t, t+1 are represented as Img(x,y,t), Img(x,y,t+1) respectively. Coordinate (x,y) is Cartesian coordinate with upper left corner of the input image frame being an origin. Img(x,y,t) is actually brightness value of a pixel at coordinate (x,y) at time t, ranging from zero to 255. Bases of Gabor filter are calculated beforehand in both x and y direction of the image frame respectively according to the following equation.

$$Gs(x, y) = 2\sqrt{\frac{\pi}{4.4a^2}} \sin\left(\frac{2\pi x}{a}\right) \exp\left(-\frac{\pi^2 r^2}{4.4a^2}\right) \quad (1)$$

$$Gc(x, y) = 2\sqrt{\frac{\pi}{4.4a^2}} \cos\left(\frac{2\pi x}{a}\right) \exp\left(-\frac{\pi^2 r^2}{4.4a^2}\right)$$

where Gs(x,y) represents sine component of the base of Gabor filter and Gc(x,y) represents cosine component of the base of Gabor filter. By the equations (1) plus other two equations, which are 90 degree rotated version of the equation (1), optical flows in four directions (upward, downward, leftward and rightward) are detected. (x, y) is represented on the coordinate with the center of the image frame being an origin (there is a relationship $r=(x^2+y^2)^{1/2}$ between x, y and r). "a" is a constant and set to a value so that filter sensitivity is high with "a" as the center. Bandwidth of spatial frequency is set to about one octave.

Gabor filter is a filter imitating the characteristics of human visual receptive field. When a mobile unit moves, features of optical flow tend to appear clearly in the center region than the peripheral region of the image frame. Thus, by applying Gabor filter to positive/negative direction of x and y direction (upward, downward, leftward and rightward) in each local area, it may be possible to clearly detect which direction the optical flow moves in the local area. Alternatively, it may be possible to optimize spatial frequency or the property of Gabor filter (for example, the size of the receptive field, that is, the size of the filter (window)) depending on the position (x,y) in the image.

The local flow processor 2 selects one local area in the input images (S2-2). Local area is an area having predetermined size to which the input image is equally divided for calculating local flow in the input images. For example, suppose the input image frame is 320*240 pixels, the size of one local area is 45*45 pixels. The local area located in the upper left corner of the image frame is first selected. Local areas are overlapped each other (see FIG. 3(a)).

When process to one local area is over, the right-neighboring local area is selected. When process to rightmost local area is over, the local flow processor 2 selects the local area in second row, which are overlapped with the first row. Such overlapping local areas enables the local flow processor 2 to repeat the process on pixels in the vicinity of the boundary of the local areas for detecting objects more correctly. However, excessive overlapping width lowers the computing speed, so the overlapping width is set to appropriate value.

Back to FIG. 2, the local flow processor 2 makes sum and product operation for each pixel Img(x,y,t), Img(x,y,t+1) included in the local area selected in step S2-2 and the base of Gabor filter in equation (1) to calculate sum and product values $x_t$, $x_{t+1}$, $y_t$, $y_{t+1}$ for all pixels in the local area (S2-3). This operation is represented by the following equation.

$$x_t = \sum_{x,y} Gs(x, y) \times Img(x, y, t) \quad (2)$$

$$y_t = \sum_{x,y} Gc(x, y) \times Img(x, y, t)$$

$$x_{t+1} = \sum_{x,y} Gs(x, y) \times Img(x, y, t+1)$$

$$y_{t+1} = \sum_{x,y} Gc(x, y) \times Img(x, y, t+1)$$

The local flow processor 2 then calculates value "dw", which is time differentials with respect to phase weighed with contrast $(x^2+y^2)$ using the sum and product values according to the following equation (S2-4).

$$dw = \{(x_t + x_{t+1}) \times (y_{t+1} - y_t) - (y_t + y_{t+1}) \times (x_{t+1} - x_t)\}/2 \qquad (3)$$

By the steps S2-3 and S2-4, four directional components (upward, downward, leftward and rightward) of the local flow are calculated. In other words, four directional "dw"s are calculated for the selected local area.

The local flow processor 2 selects the greatest "dw" out of the four directional dw's. Then the selected dw is set as "dw value" of the interested local area and the direction of the selected dw is set as "flow direction" of the interested local area (S2-5). These "dw value" and "flow direction" are assigned to one entry in a dw map and a direction map respectively (S2-6). Each entry in these maps corresponds to the position of the local area in the input image frame, as shown in FIG. 3(b).

When the above-described process on one local area is over, same process is performed on neighboring local area as described before with reference to FIG. 3(a). Same process is performed on all local areas (S2-7).

Figures 3, 4, 5:
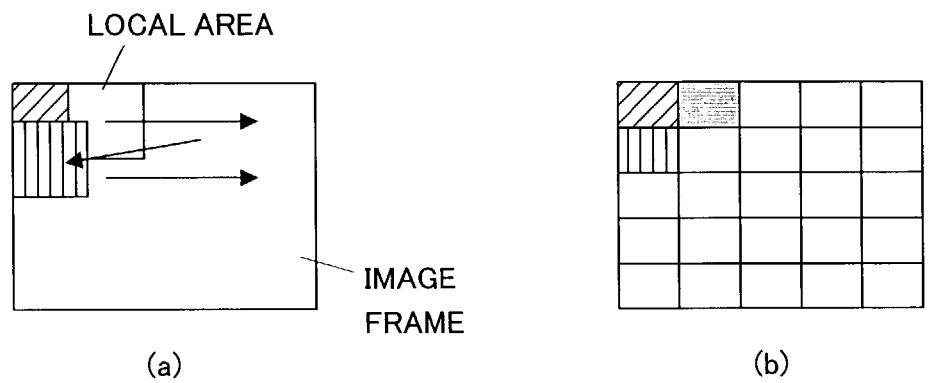
FIG. 3 shows conceptual diagrams illustrating relationship between (a) the position of local areas and (b) a map.
FIG. 4 shows conceptual diagrams illustrating dw map for (a) upward direction and (b) leftward direction.
FIG. 5 shows conceptual diagrams illustrating (a) a dw map and (b) a direction map.

FIGS. 4 and 5 show one example of the process in the local flow processor 2. FIGS. 4(a) and 4(b) represent examples of dw maps for upward direction and leftward direction respectively. Numbers in the maps are "dw value" of each local area corresponding to the position in the input image frame. Numbers are shown only for some local areas.

The local flow processor 2 compares dw values for four directions in the local area and selects the greatest dw value and sets the direction of the greatest dw value set as flow direction. For example, dw values in the local area at upper left corner of an upward direction dw map (FIG. 4(a)) and a leftward direction dw map (FIG. 4(b)) are "3" and "1", respectively. Therefore, dw value in this local area is set to "3" as a result of comparing these dw values (see FIG. 5(a)). The flow direction is set to "upward" corresponding to the direction of the dw value having the value of "3" (see FIG. 5(b)). It should be noted that, in actual object detection process, same operation is performed on four dw values of four direction. By repeating above-described operation on all local areas, a dw map and a direction map may be obtained for the input images as shown in FIG. 5(a), (b). If dw values are equal in the comparing operation, previous dw value is selected.

The operation by the local flow processor 2 described above proves which directional component of the optical flow in each local area is the greatest.

Global Flow Processor

Figure 6:
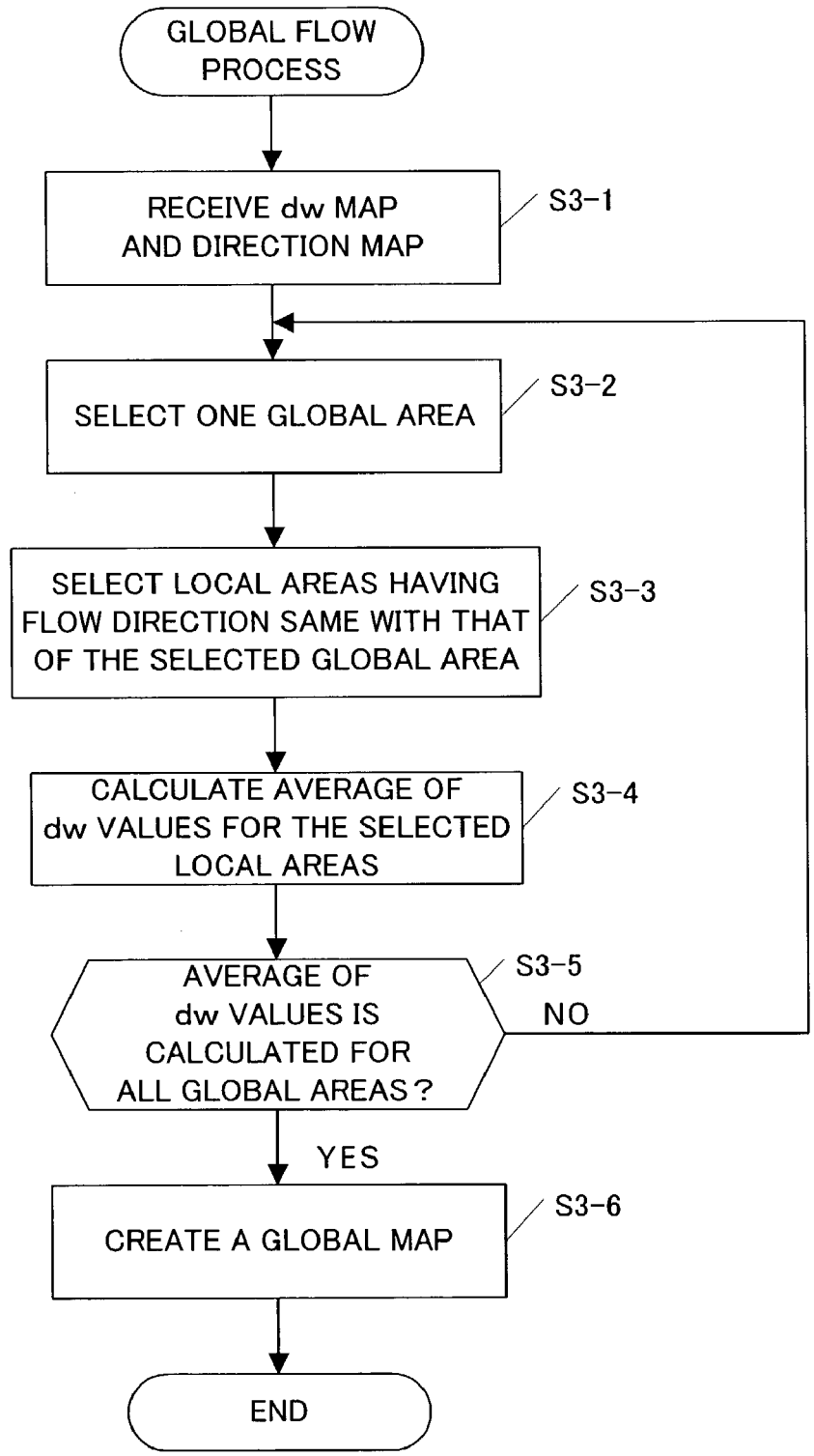
FIG. 6 is a flowchart of a global flow processor.
Figure 7:
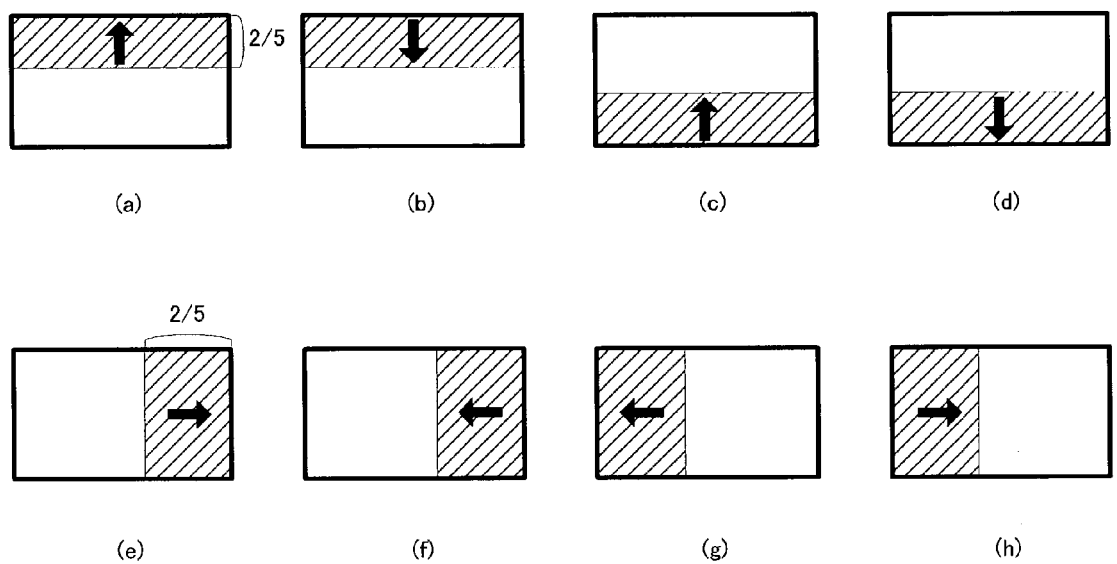
FIG. 7 shows one example of global areas.

FIG. 6 is a flowchart of operations in the global flow processor 3 during the object detection process. The global flow processor 3 receives the dw map and direction map calculated in the local flow processor 2 (S3-1). The global flow processor 3 then selects one global area out of eight predetermined global areas (S3-2). One example of global areas is shown in FIG. 7(a) to (h). In FIG. 7, each of thick-line rectangles in (a) to (h) corresponds to the input image frame. Slanted-lined areas in (a) to (h) are global areas. Length of one edge of each global area is ⅖ (two fifth) of that of the image frame (in other words, each global area is sized to occupy ⅖ area of the image frame). Furthermore, each global area has one specified flow direction out of four directions (upward, downward, leftward and rightward), which are shown by arrows in FIG. 7.

The global flow processor 3 selects some local areas that have flow direction same with the specified direction for the global area, out of the local areas included in the global area selected in step S3-2 (S3-3). Then the global flow processor 3 calculates the average of dw values for the selected local area (S3-4). With reference to FIGS. 5 and 7, this operation is described more specifically. Suppose global area (a) is selected, the global flow processor 3 selects local areas having upward flow direction by searching the direction map out of the local areas included in the slanted-lined region of the global area (a). Then the global flow processor 3 obtains dw values of selected local areas by searching the dw map and then calculates the average of those dw values. In this example, an average is calculated of dw values in entries surrounded with thick line A in the dw map for upward direction in FIG. 5(a).

After the average of dw values is calculated for the global area (a), same calculation is performed on other global areas (S3-5). When the averages of dw values are calculated for eight global areas, the global flow processor 3 creates a global flow map as shown in FIG. 8 (S3-6). The averages are assigned to this map in such order that the average of dw values of local areas having the upward flow direction and included in the global area (a) is in first entry, the average of dw values of local areas having the downward direction and included in the global area (b) is in second entry, and so on as shown in FIG. 8.

By creating such a global flow map, features of the optical flow generated depending on the motion of the mobile unit may be represented with this map. For example, when the mobile unit moves forward, averages of dw values in global areas (a) (d), (e) and (g) become greater values. When the mobile unit moves rightward, averages of dw values in global areas (a), (d), (f) and (g) become greater values. When the mobile unit moves leftward, averages of dw values in global areas (a), (d), (e) and (h) become greater values.

In this embodiment, eight global areas are used. Alternatively, more global areas may be used to represent features of the optical flow of the image more precisely.

The reason why the size of each global area is set to ⅖ of the input image frame is to capture features of optical flow in peripheral region of the image effectively because features of optical flow generally appears strongly in peripheral region than central region of the image, as described above. Setting global areas to peripherals of the input image frame enables the global flow processor 3 to capture features of optical flow appeared depending on the motion of the mobile unit exactly, while reducing the computing load sufficiently. Alternatively, other global area size such as ⅓ or ¼ of the input image frame may be employed if each of global areas does not include the central region of the image.

Flow Feature Calculator

The flow feature calculator 4 performs so-called figure/ground segmentation, which segments optical flow into local areas having flow direction same with flow generated by the motion of the mobile unit ("figure") and local areas having different flow direction ("ground").

As described before, features of optical flow of the image appearing depending on the motion of the mobile unit may be represented as the eight averages of dw values (that is, eight features). Therefore, by learning with Perceptron using training data for the relationship between eight features and parameters for the motion of the mobile unit (hereinafter referred to as "self-motion parameters"), mapping may be easily obtained from eight features to self-motion parameters. This learning enables the object detection apparatus 10 to estimate self-motion parameter from the eight features without any motion sensors during the object detection process.

The self-motion parameter includes, for example, velocity or rotation angle of the mobile unit detected by a speed meter or a gyroscope thereon, respectively. The type of the self-motion parameters is determined depending on the kind of the mobile unit in consideration of the influences generated by the self-motion to be removed from the image. For example, for detecting objects in the image captured from a rotating mobile unit, rotating direction may be employed as a self-motion parameter. For detecting objects in the image captured from a velocity-changing mobile unit, the velocity may be employed as a self-motion parameter. Alternatively, code showing motion of the mobile unit may be used as a self-motion parameter. In this embodiment, traveling directions of the mobile unit (namely, "going straight", "turning right" and "turning left") are employed as self-motion parameters. One of these parameters is given to the flow feature calculator 4 depending on the traveling direction of the mobile unit.

Figure 9:
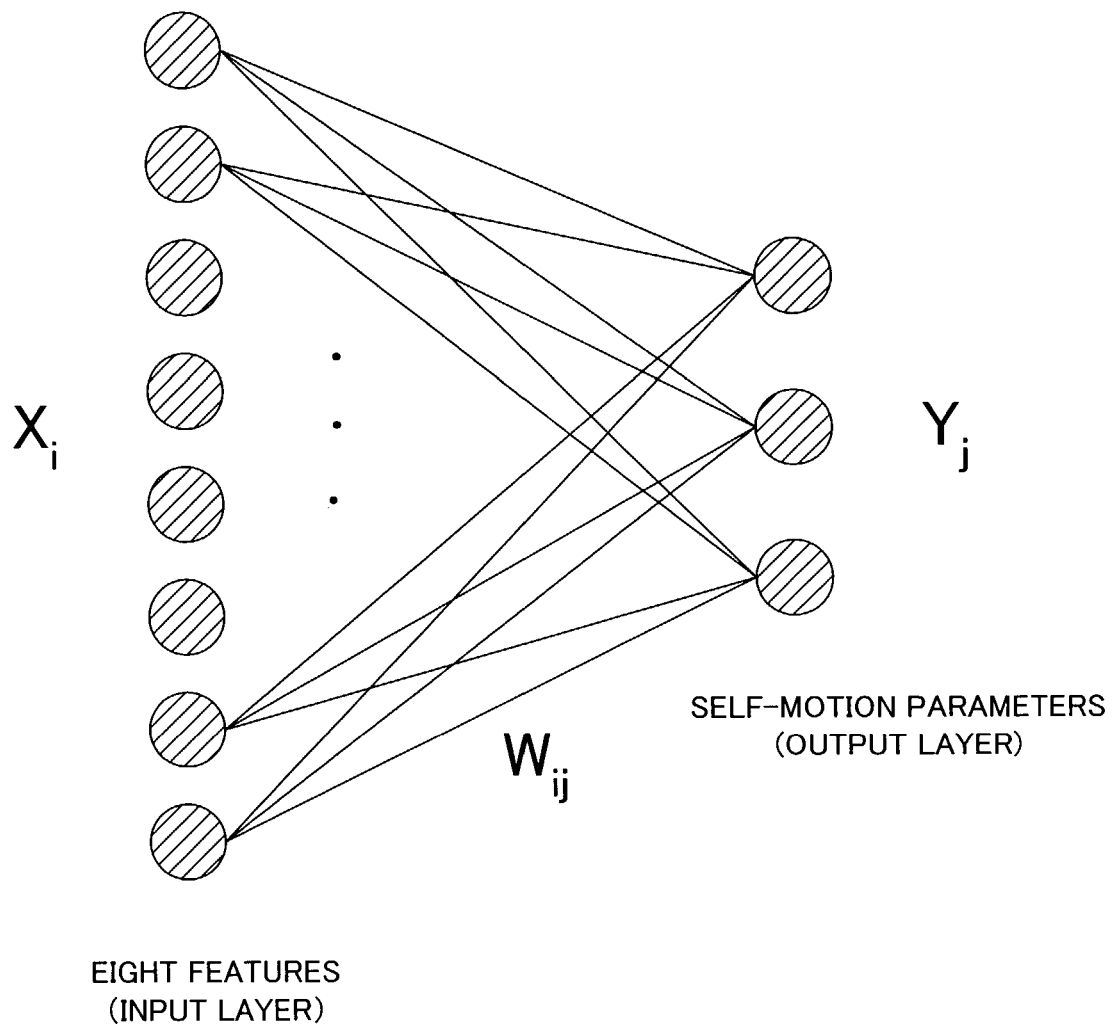
FIG. 9 illustrates one example of Perceptron for use in learning in the flow feature calculator.

FIG. 9 illustrates one example of Perceptron for use in learning the relationship between eight features and self-motion parameters. This learning is performed by the flow feature calculator 4 prior to the object detection process. Cells $X_i$ in left column (input layer) correspond one-to-one to eight features calculated by the global flow processor 3. A cell at the top in the input layer is the average of dw values in the global area (a) of FIG. 7. The second top cell in the input layer is the average of dw values in the global area (b). Other cells are in a like manner. Cells $Y_j$ in right column (output layer) correspond one-by-one to self-motion parameters. In this embodiment, cells correspond to "going straight", "turning right" and "turning left" from top to bottom, respectively. Cells in both the input layer and the output layer are provided depending on the number of the features and the self-motion parameters respectively.

Training data for the relationship between eight features and self-motion parameters are given by the data structure shown in FIG. 10, for example. In FIG. 10, self-motion parameters are same in number as cells $Y_j$. The flow feature calculator 4 performs learning according to the following process.

Suppose $X_i$ is value of i-th cell in the input layer and $Y_j$ is value of j-th cell in output layer, $Y_j$ is calculated by the following equation.

$$Y_j = \frac{1}{1+\exp(-X_i \times W_{ij})}, \quad i=1\cdots 8, \quad j=1,2,3 \qquad (4)$$

where $W_{ij}$ represents weight between cell i in the input layer (an input cell) and cell j in the output layer (an output cell). In this embodiment, appropriate initial value is given to $W_{ij}$. $Y_j$ is calculated by assigning eight features in the training data to $X_i$ in the equation (4).

Then $Y_j$ is compared with self-motion parameter associated with the eight features in the training data. If $Y_j$ matches the self-motion parameter of the training data, $T_j$ is set to 1. If $Y_j$ does not match the self-motion parameter, $T_j$ is set to 0. Then error $E_j$ of an output cell j is calculated by the following equation.

$$E_j = Y_j - T_j \qquad (5)$$

Weight $W_{ij}$ is then updated. This updating is performed according to the error back propagation algorithm in the following equation.

$$W_{ij} \leftarrow W_{ij} + \varepsilon \times E_j \times Y_j \times (1-Y_j) \times X_j \quad \varepsilon : a \text{ learning ratio} \qquad (6)$$

Same operation is performed on all given training data to update the weight $W_{ij}$ successively. After the learning is over, it is possible to estimate one self-motion parameter from eight features using weight $W_{ij}$. In other words, it is possible to estimate which direction the mobile unit is traveling.

It should be noted that any other learning algorithm may be used to learn the relationship between eight features and self-motion parameters.

In general, optical flow has the characteristics that different type of flow is emerged in the region where stationary objects are present when extracting optical flow of local areas. Therefore, it is preferable that training data is prepared based on the image including few stationary objects. By performing the learning with such training data, it is possible to detect stationary objects as well as moving objects in the image by detecting flow direction different from those consistent with the self-motion parameter.

Figure 11:
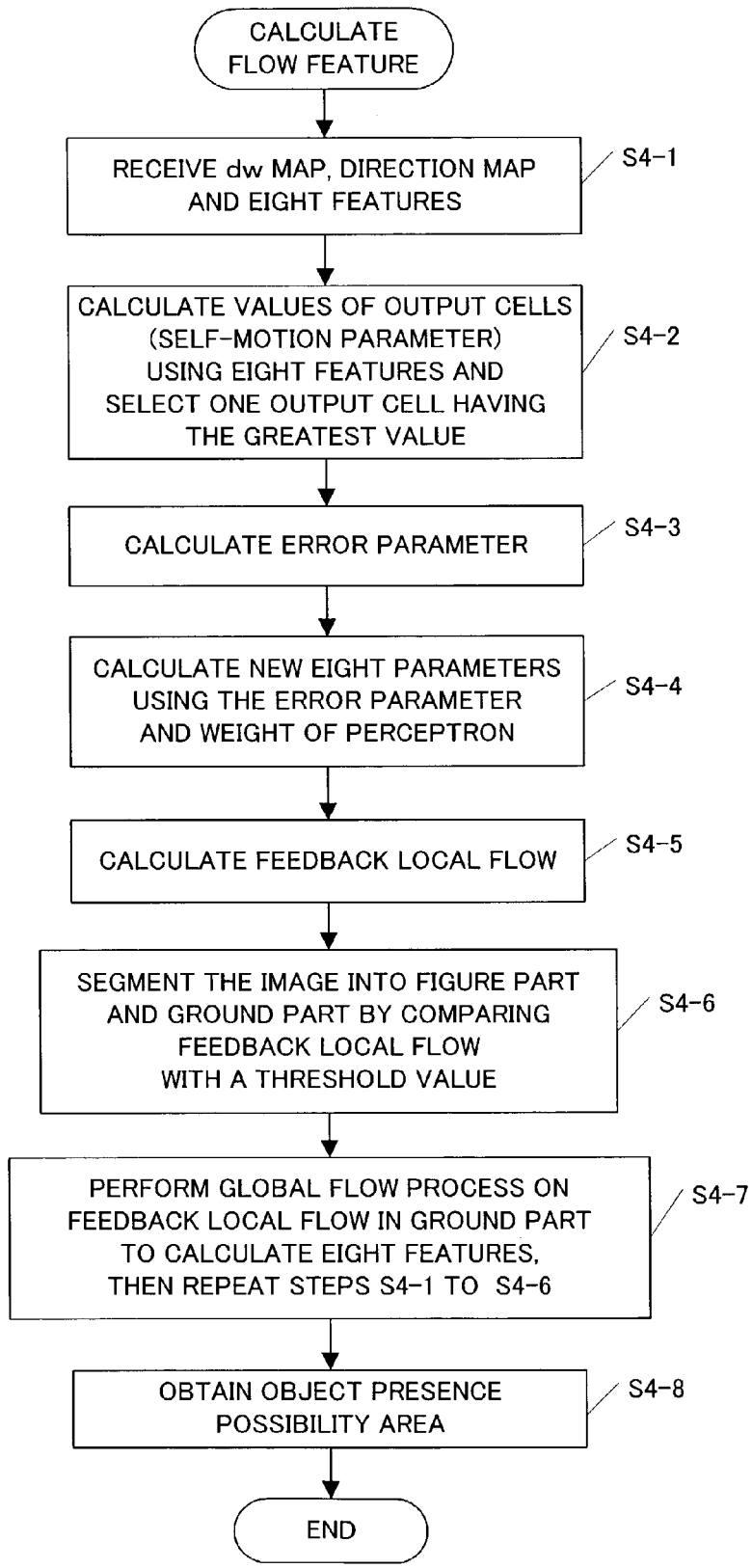
FIG. 11 is a flowchart of a flow feature calculator.

FIG. 11 is a flowchart illustrating operations in the flow feature calculator 4 during the object detection process. The flow feature calculator 4 receives dw maps and direction maps from the local flow processor 2 and eight features from the global flow processor 3 (S4-1). The flow feature calculator 4 calculates $Y_j$ of output cells according to the equation (4) using eight features and weight $W_i$ of Perceptron. The flow feature calculator 4 selects one output cell having the greatest value (S4-2).

For example, suppose values of three output cells of Perceptron in FIG. 9 are (0.5, 0.25, 0.25) respectively, the flow feature calculator 4 selects the output cell whose value is "0.5" as a winner. The flow feature calculator 4 sets value of the selected output cell to "1" and values of other cells to "0" (that is, values of three output cells in FIG. 9 are set to (1, 0, 0)).

Then the flow feature calculator 4 calculates the error between the original values and above-set values (S4-3). In this example, the error is (−0.5, 0.25, 0.25). This is referred to as "an error parameter".

Multiplying the error parameter by weight $W_i$ of Perceptron results to new eight parameters which correspond to the input cells respectively (S4-4). These new eight parameters take value except zero and may take negative value.

The flow feature calculator 4 multiplies the new eight parameters by values in dw map in FIG. 5(a) (S4-5). More specifically, suppose the new eight parameters are calculated as (1,2,3,4,5,6,7,8) from top to bottom of the input cell. That is, (1,2,3,4,5,6,7,8) correspond to the global areas (a) to (h) in FIG. 7 respectively. For example, the flow feature calculator 4 selects the dw values of the local areas having upward flow direction and included in the global area (a) by searching the dw map and the direction map (dw values surrounded by solid line A as shown in FIG. 5(a)). The calculator 4 multiplies the dw values by "1" that is corresponding eight new parameter. Likewise, the flow feature calculator 4 selects the dw values of the local areas having leftward flow direction and included in the global area (g). The calculator 4 multiplies the dw values by "7" that is the corresponding eight new parameter. One example of the result that same process is performed on all of the new eight parameters is shown in FIG. 12(a) (this result is hereinafter referred to as "feedback local flow"). Values in FIG. 12(a) may take negative values.

The flow feature calculator 4 then compares each value in the map of FIG. 12(a) with predetermined threshold value (for example, 1.0). The part having smaller value than the threshold value is determined as "ground" part (shown in FIG. 12(b)). The area having the threshold value or more is determined as "figure" part (shown in FIG. 12(c)) (S4-6).

Furthermore, the flow feature calculator 4 obtains a new dw map for local flow (shown in FIG. 12(d)) by assigning zero to entries corresponding to the "figure" part. The calculator 4 performs both the above-mentioned global flow process and steps from S4-1 to S4-6 on this new local flow once again (S4-7).

The flow feature calculator 4 sets a rectangular area (surrounded by a solid line in FIG. 12(c)) including "figure" part segmented in second-time step S4-6, as an area where there is possibility that objects are present (hereinafter referred to as "object presence possibility area") (S4-8). This rectangular area has predetermined constant size. If the size of the local areas segmented in step S4-6 in secondary process is too smaller or too larger than the size of the predetermined rectangle area, the rectangular area is scaled (variable) to appropriate size such that the "figure" part is best contained in the rectangular area. This rectangular area (that is, object presence possibility area) is an area where there is high possibility that the object is included. The object presence/absence determiner 7 determines whether the object is really present in the object presence possibility area. It should be noted that when there are two or more objects in the input images, two or more object presence possibility areas are established and the object presence/absence determination process is performed to each object presence possibility area.

The reason why feedback local flow is further calculated after the error parameters are calculated is to facilitate the feature/ground segmentation by emphasizing the error from the real motion of the mobile unit. By flow feature calculation mentioned above, it is possible to segment the object presence possibility area more accurately. In particular, repeating steps S4-1 and S4-2 improves the accuracy of extracting the object presence possibility area.

Object Presence/Absence Determiner

The object presence/absence determiner 7 determines whether the object is really included in the object presence possibility area obtained by the flow feature calculator 4. The object presence/absence determiner 7 performs second learning prior to the object detection process to create eigenspace for the determination.

Figure 13:
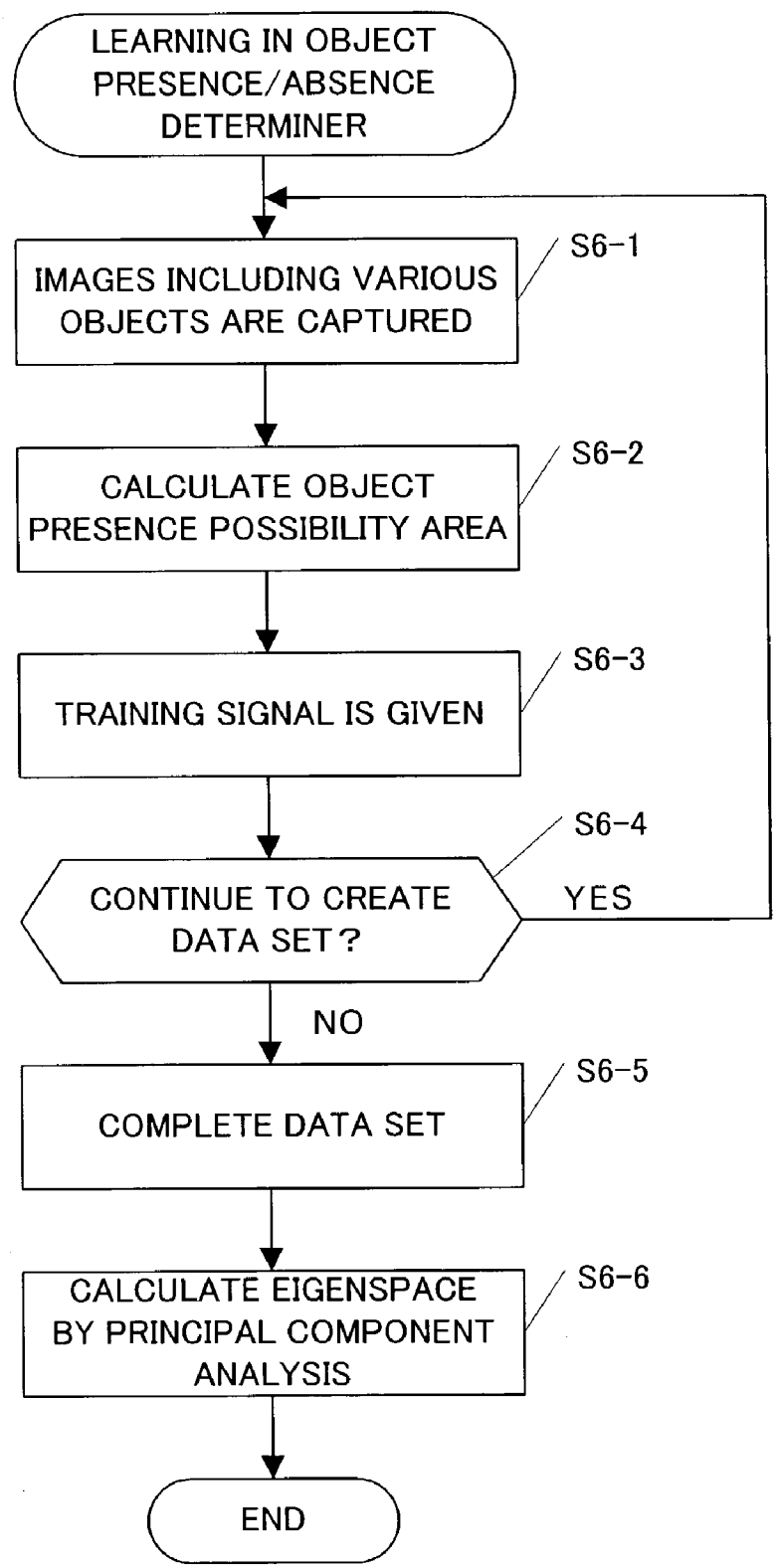
FIG. 13 is a flowchart of learning in an object presence/absence determiner.

FIG. 13 is a flowchart illustrating the second learning. First, images of environment including various objects to be determined as "object is present" by the object detection apparatus 10 are captured by the imaging device 12 (S6-1). These images are processed by the local flow processor 2, the global flow processor 3 and the flow feature extraction block 4 successively as described above to calculate the object presence possibility area like FIG. 12(c) (S6-2). Objects captured by the imaging device includes both moving objects and stationary objects. Images having no object are also captured. Furthermore, both moving version and stationary version of same objects are captured.

Then the operator checks the object presence possibility area and gives training signals to the object detection apparatus 10 with regard to whether an object is really present or not in the area (S6-3). This training signal is a numerical representation which indicates "1.0" when an object is present or "0.0" when no object is present. Whether creating data set is continued or not is determined (S6-4).

By repeating image capturing and providing training signals (S6-1 to S6-4), data set is obtained which includes a lot of correspondence between image of the object presence possibility area and the numerical representation about the presence/absence of objects (S6-5). Data structure of this data set is shown in FIG. 14, for example. In FIG. 14(a), top row is pixel sequence included in the object presence possibility area and brilliance of each pixel is stored in predefined order. Second row is sequence of local flow for local areas included in the object presence possibility area. For example, flow direction and dw value of each local area are stored respectively as shown in FIG. 14(b). In FIG. 14(b), arrows in top row represent flow direction and values in bottom row represent dw values. In the third row of FIG. 14(a), position information of the object presence possibility area in the image frame is stored. Since the rectangular size of the object presence possibility area is constant, it is sufficient to store the position (x,y) of the upper left corner of the rectangle. If the rectangular size is variable, the position (x,y) of, for example, the lower right corner of the rectangle is additionally stored. In the fourth row of FIG. 14(a), the numerical representation (1.0 or 0.0) for the presence/absence of objects is stored. For example, when there are 20, 20, 2 and 1 data are stored from the first row to fourth row, total 43-th dimensional data set is obtained.

In the second learning, eigenspace $PCA_1$, $PCA_2$, ..., $PCA_n$ are calculated for obtained data set by principal component analysis (S6-6). n is the number of eigenvectors. This number is depended on the cumulative contribution ratio that is defined by how accurate the eigenvector represents features of the data set.

By performing such second learning prior to the object detection process, it is possible to determine the presence/absence of object in the object presence possibility area.

Figure 15:
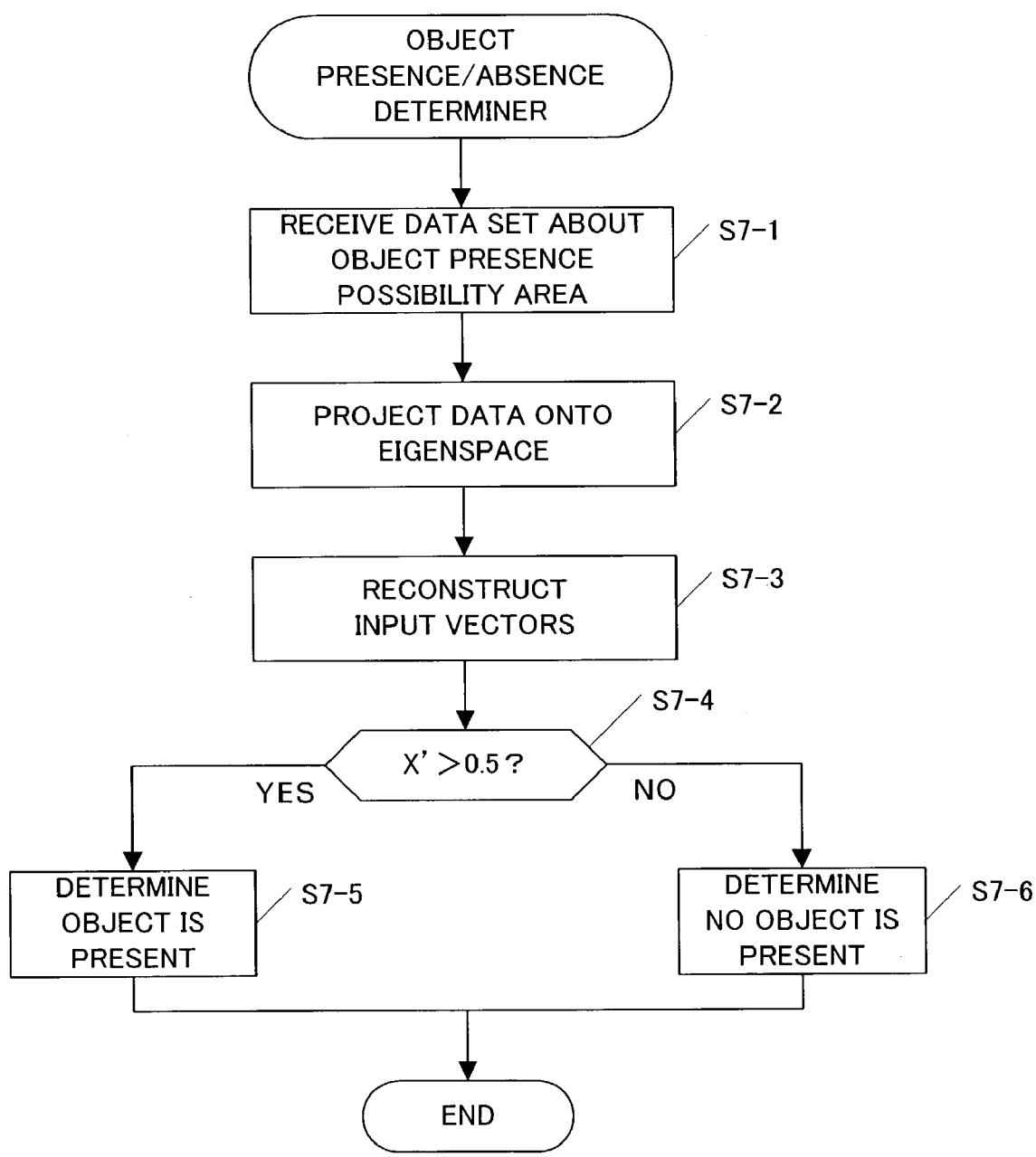
FIG. 15 is a flowchart of an object presence/absence determiner.

FIG. 15 is a flowchart illustrating the process by the object presence/absence determiner 7 during the object detection process. First, the object presence/absence determiner 7 receives data set about the object presence possibility area (S7-1). This data set has same data structure as shown in FIG. 14(a). The object presence/absence determiner 7 projects the data onto the eigenspace which are calculated by above-described principal component analysis with the numerical representation being "0.5" (S7-2). By multiplying the principal component vectors by input vectors based on the data about the object presence possibility area from first order to n-th order, coordinate of the projected eigenspace is obtained. This operation is represented by the following equation.

$$x_1 = X \cdot PCA_1$$

$$x_2 = X \cdot PCA_2$$

$$...$$

$$x_n = X \cdot PCA_n \qquad (7)$$

where X is input vector and $(x_1, x_2, x_n)$ is coordinate of eigenspace. Input vectors are reconstructed according to the following equation into reconstructed input vectors X' (S7-3).

$$X' = x_1 \cdot PCA_1 + x_2 \cdot PCA_2 + \cdots + x_n \cdot PCA_n \qquad (8)$$

The object presence/absence determiner 7 compares the reconstructed input vector X' with "0.5" (S7-4). If X' is larger than 0.5, the determiner 7 determines that the object is really present in the object presence possibility area (S7-5). If X' is less than or equal to 0.5, the determiner 7 determines that no object is present in that area (S7-6).

Thus the object presence/absence determiner 7 may determine the presence or absence of objects in the "figure" part calculated by the flow feature calculator 4.

Example of the Object Detection Process

One exemplary process of detecting objects when the object detection apparatus 10 is mounted on a mobile unit is described.

Before starting the object detection process, two types of learning are performed. The first learning is performed in the global flow processor 3 as described above for obtaining the relationship between the global flow (eight features) and self-motion parameters. By this first learning, the object detection apparatus 10 may estimate self-motion parameter from the global flow.

The second learning is performed in the object presence/absence determiner 7 as described above for obtaining the relationship between the presence or absence of objects and sequence of local flows of the image having objects therein. The object detection apparatus 10 may use the eigenspace calculated from this second learning to determine the presence or absence of the object in the object presence possibility area.

The result of the first and second learning are stored in ROM (not shown) as learning result 5 and 6 in FIG. 1.

Figure 16:
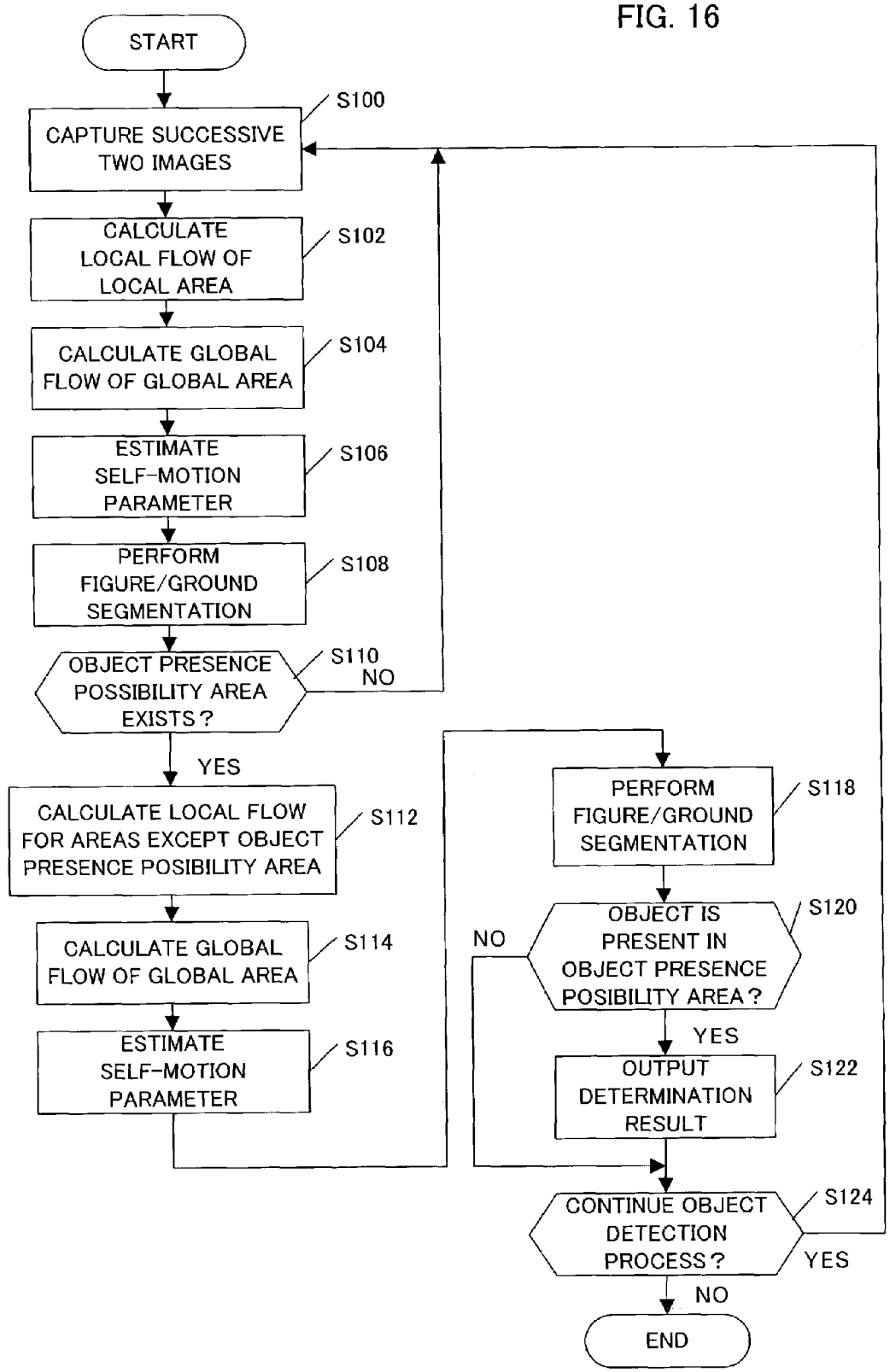
FIG. 16 is an overall flowchart of the object detection by an object detection apparatus of this invention.

FIG. 16 is a flowchart of the object detection process. Successive two or more images are captured (S100). For these images, local flow of local areas are calculated by the local flow processor 2 (S102). Then global flow of global areas are calculated by the global flow processor (S104).

Flow feature calculator 4 estimates a self-motion parameter from the local flow and the global flow (S106) and performs figure/ground segmentation segmenting the image into local areas consistent with the self-motion parameters and local areas not consistent with self-motion parameters (that is, object presence possibility area) (S108). Then whether object presence possibility area exist or not is determined (S110). When no object presence possibility area exist, there is no possibility that object is present in the input images. Therefore, the process is repeated on new images. When object presence possibility area exist in step S110, same process is repeated on remaining local areas where the object presence possibility area is removed from the input images. In other words, calculation of local flow (S112), calculation of global flow (S114), estimation of self-motion parameter (S116) and figure/ground segmentation (S118) are performed.

In some case, the object presence possibility area may be not obtained accurately in the effect of noise in one-time figure/ground segmentation. Therefore, in this example the accuracy of the figure/ground segmentation may be improved by repeating same process like steps S112 to S118.

Alternatively, the object presence/absence determination may be performed directly on the object presence possibility area segmented in step S108.

The object presence possibility area repeatedly calculated in step S118 is sent to the object presence/absence determiner 7, where it is determined whether the object is really present in that area (S120). When it is determined the object is present, its result is output (S122). When it is determined that no object is present, the process goes to step S124, where it is determined whether the object presence determination process is continued. If the object presence determination process is continued, the process goes back to step S100.

The output result in step S122 is sent to a motor or steering of the mobile unit or passengers. Thus, the mobile unit or passengers thereon may decelerate or stop the mobile unit or avoid the object.

Although some specific embodiments of the invention have been described, the invention is not limited to such embodiments. For example, a well-known pattern matching may be used for determination in the object presence/absence determiner 7 instead of using eigenvectors.

In alternative embodiment, features of local flow in left-side peripheral area, right-side peripheral area and bottom peripheral area may be used as global flow. In further alternative embodiment, features of local flow in left-side peripheral area, right-side peripheral area, bottom peripheral area and top peripheral area may be used as global flow.

In alternative embodiment, the motion of the mobile unit may be estimated from local flow calculated by the local flow processor 2 to segment, as the object presence possibility area, local flow different from optical flow produced by the estimated motion with the first learning. According to this embodiment, the object presence apparatus 10 may perform the object detection process without a global flow processor 3.

As described above, one feature of to the invention is that the object presence apparatus 10 first defines the part having optical flow produced by the self-motion in the input images then determines for the remaining part of the input images whether objects are present.

According to the present invention, both local flow process and global flow process are performed to segment the area that is not consistent to self-motion. Since the object presence/absence determination process is performed only on that area, accurate object detection may be accomplished with less computing load.

Furthermore, by learning with images with few stationary objects in learning with Perceptron in the global flow processor, stationary objects as well as moving objects may be detected as flow different from flow direction of local areas consistent with self-motion parameter.

What is claimed is:

1. An object detection apparatus for detecting objects in input images captured from a mobile unit, comprising:
    a local flow processor for calculating flow information for each local area in said input images;
    a global flow processor for calculating flow information for each global area in said input images using said flow information for each of a plurality of local areas;
    a flow feature calculator for estimating motion of the mobile unit using said flow information for each of a plurality of global areas, calculating new flow information using the estimated motion, comparing said new flow information with said flow information for each local area to extract local areas having flow information not consistent with said estimated motion; and an object presence/absence determiner for determining the presence or absence of objects in the extracted local areas.

2. The object detection apparatus according to claim 1, wherein said local flow processor applies Gabor filter to each local area to calculate the magnitude of optical flow in predetermined directions of the local area as said flow information of each local area.

3. The object detection apparatus according to claim 2, wherein said local flow processor set the greatest one as size in predetermined directions of the local area, sets the greatest one as the magnitude of flow for the local area and sets the direction of that flow as a flow direction of the local area.

4. The object detection apparatus according to claim 3, wherein said global flow processor obtains all flow information for local areas included in each global area, selects local areas having the flow direction predetermined for each global area based on the flow information for local areas and sets the average of the magnitude of flow for the selected local area as said flow information for the global area.

5. The object detection apparatus according to claim 1, wherein said global areas occupy different peripheral areas in said input images.

6. The object detection apparatus according to claim 1, wherein said flow feature calculator applies said flow information of each global area to a result of a first learning to estimate the motion of said mobile unit.

7. The object detection apparatus according to claim 6, wherein said first learning is performed by associating said flow information for each global area with the motion of the mobile unit using a neural network.

8. The object detection apparatus according to claim 7, wherein said neural network is Perceptron.

9. The object detection apparatus according to claim 1, wherein said extracted local areas are repeatedly processed in said global flow processor and said flow feature calculator.

10. The object detection apparatus according to claim 1, wherein said object presence/absence determiner determines the presence or absence of objects based on a second learning which associates said extracted local areas with the presence or absence of objects.

11. A computer program stored on a computer readable medium, executable on a computer for detecting objects in input images captured by an imaging device on a mobile unit, when executed, said computer program performing the steps of:
calculating flow information for each of a plurality of local areas in said input images;
calculating flow information for each of a plurality of global areas in said input images using said flow information for each local area;
estimating motion of the mobile unit using said flow information for each global area;
calculating new flow information using the estimated motion;
comparing said new flow information with said flow information for each local area to extract local areas having flow information not consistent with said estimated motion; and
determining the presence or absence of objects in the extracted local areas.

12. A computer program stored on a computer readable medium, executable on a computer for detecting objects in input images captured by an imaging device on a mobile unit, when executed, said computer program performing the steps of:
(a) calculating flow information for each of a plurality of local areas in said input images;
(b) calculating flow information for each of a plurality of global areas in said input images using said flow information for each local area;
(c) applying said flow information for global area to a result of a first learning to estimate the motion of said mobile unit;
(d) estimating motion of the mobile unit using said flow information for each global area;
(e) calculating new flow information using the estimated motion;
(f) comparing said new flow information with said flow information for each local area to extract local areas having flow information not consistent with said estimated motion;
(g) repeating the steps (a) to (f) on said extracted local areas to extract second local areas; and
(h) determining the presence or absence of objects in said second local areas.

13. An object detection method for detecting objects in input images captured from a mobile unit, comprising:
calculating flow information for each of a plurality of local areas in said input images;
calculating flow information for each of a plurality of global areas in said input images using said flow information for each local area;
estimating motion of the mobile unit using said flow information for each global area;
calculating new flow information using the estimated motion;
comparing said new flow information with said flow information for each local area to extract local areas having flow information not consistent with said estimated motion; and
determining the presence or absence of objects in the extracted local areas.

14. An object detection method for detecting objects in input images captured from a mobile unit, comprising:
(a) calculating flow information for each of a plurality of local areas in said input images;
(b) calculating flow information for each of a plurality of global areas in said input images using said flow information for each local area;
(c) applying said flow information for global area to a result of a first learning to estimate the motion of said mobile unit;
(d) estimating motion of the mobile unit using said flow information for each global area;
(e) calculating new flow information using the estimated motion;
(f) comparing said new flow information with said flow information for each local area to extract local areas having flow information not consistent with said estimated motion;
(g) repeating the steps (a) to (f) on said extracted local areas to extract second local areas; and
(h) determining the presence or absence of objects in said second local areas.

* * * * *

UNITED STATES PATENT AND TRADEMARK OFFICE
CERTIFICATE OF CORRECTION

PATENT NO. : 7,062,071 B2
APPLICATION NO. : 10/322307
DATED : June 13, 2006
INVENTOR(S) : Hiroshi Tsujino It is certified that error appears in the above-identified patent and that said Letters Patent is hereby corrected as shown below:

Claim 2, Col. 15, line 8, delete the word "filter" and add --filtering.--

Claim 3, Col. 15, line 13, delete the words "set the greatest one as size" and insert --compares the magnitude--

Claim 3, Col. 15, line 14, delete the words "in predetermined directions of the local area, set the great-" and insert --of optical flow in predetermined directors of the local area,--

Claim 3, Col. 15, line 15, delete the words "est one as the magnitude of flow for the local area and sets" and insert --sets the greatest one as the magnitude of flow for the local--

Claim 3, Col. 15, line 16, delete the words "the direction of that flow as a flow direction of the local area." and insert --area and sets the direction of that flow as a flow direction of the local area.--

UNITED STATES PATENT AND TRADEMARK OFFICE
CERTIFICATE OF CORRECTION

PATENT NO. : 7,062,071 B2
APPLICATION NO. : 10/322307
DATED : June 13, 2006
INVENTOR(S) : Hiroshi Tsujino It is certified that error appears in the above-identified patent and that said Letters Patent is hereby corrected as shown below:

Claim 4, Col. 15, line 20, after "local areas" add --,--.

Claim 10, Col. 15, line 44, after "learning" add --,--.

Signed and Sealed this

Third Day of October, 2006

JON W. DUDAS
*Director of the United States Patent and Trademark Office*